United States Patent [19]

Fernandez et al.

[11] Patent Number: 4,545,467

[45] Date of Patent: Oct. 8, 1985

[54] INTEGRATED CONSOLE BRACKET

[75] Inventors: John E. Fernandez, Troy; William J. LaRocca, Warren, both of Mich.

[73] Assignee: Gulf & Western Manufacturing Company, Southfield, Mich.

[21] Appl. No.: 488,905

[22] Filed: Apr. 27, 1983

[51] Int. Cl.$^4$ ............... B60K 41/26; B60K 20/04
[52] U.S. Cl. ..................... 192/4 A; 74/473 R; 180/336
[58] Field of Search ............ 192/4 A; 180/315, 336; 74/473 R

[56] References Cited

U.S. PATENT DOCUMENTS

| | | | |
|---|---|---|---|
| 1,468,522 | 9/1923 | Snell et al. | 180/315 |
| 1,735,542 | 11/1929 | Monday | 192/4 A |
| 1,788,894 | 1/1931 | Schjolin | 180/336 |
| 1,897,216 | 2/1933 | Schmidt | 192/4 A |
| 1,898,492 | 2/1933 | Morse | 192/4 A |
| 2,039,553 | 5/1936 | Roehrl | 192/4 A |
| 4,326,432 | 4/1982 | Miller | 192/4 A |
| 4,364,450 | 12/1982 | Kemp et al. | 74/473 R |

Primary Examiner—Rodney H. Bonck
Assistant Examiner—Richard M. Lorence
Attorney, Agent, or Firm—A. Thomas Kammer

[57] ABSTRACT

An integrated console bracket is provided having the appropriate hardware for mounting a shifter mechanism and a parking brake mechanism thereto. The bracket is integral in construction and includes a front end to which the shifter mechanism is mounted, a rear end including the parking brake mechanism, and an integral intermediate portion connecting the two ends. The intermediate portion may include a pair of connecting members separated by a space. The connecting members are shaped so as to provide sufficient strength and rigidity to the bracket.

10 Claims, 6 Drawing Figures

INTEGRATED CONSOLE BRACKET

BACKGROUND OF THE INVENTION

1. Field of the Invention

The field of the invention relates to a one-piece bracket assembly to which a gearshift and hand brake may be mounted.

2. Brief Description of the Prior Art

The shifter and parking brake mechanisms of automobiles have been manufactured as separate units and are mounted about one foot from each other. They require careful alignment in assembly within the vehicle to insure proper fit of the console. Since they are separate, the assemblies require individual fasteners, part numbers, and strong floor pan tunnel supports.

A gear shift mechanism for an automatic transmission is shown in U.S. Pat. No. 4,326,432. It includes a housing or bracket mounted to an automobile floor member.

A typical parking brake assembly has included a mounting bracket, a brake lever pivotably mounted to the bracket, and release means for unlocking the lever from a fixed or braking position.

SUMMARY OF THE INVENTION

An integrated console bracket is provided having means for mounting both a gearshift and a hand brake lever thereto. The bracket is constructed to minimize weight yet provide more than sufficient strength.

The bracket includes a front end including means for pivotably mounting a shifter mechanism tereto. The rear end includes a parking brake mechanism. A pair of integral connecting members extends between the front and rear ends of the bracket.

Advantages of the integrated console bracket over separate brackets include: (1) tight control over alignment of the shifter and parking brake mechanisms; (2) fewer fasteners required; (3) a less rigid tunnel member required as the bracket is a strong member itself. In addition, only one part number is required for the automotive company. These advantages combine for a lower overall cost than is possible with conventional separate brackets.

BRIEF DESCRIPTION OF THE DRAWINGS

FIG. 4 is a sectional view taken along the plane of line 4—4 in FIG. 2;

FIG. 5 is a sectional view taken along the plane of line 5—5 in FIG. 2; and

DETAILED DESCRIPTION OF THE INVENTION

Figure 1:
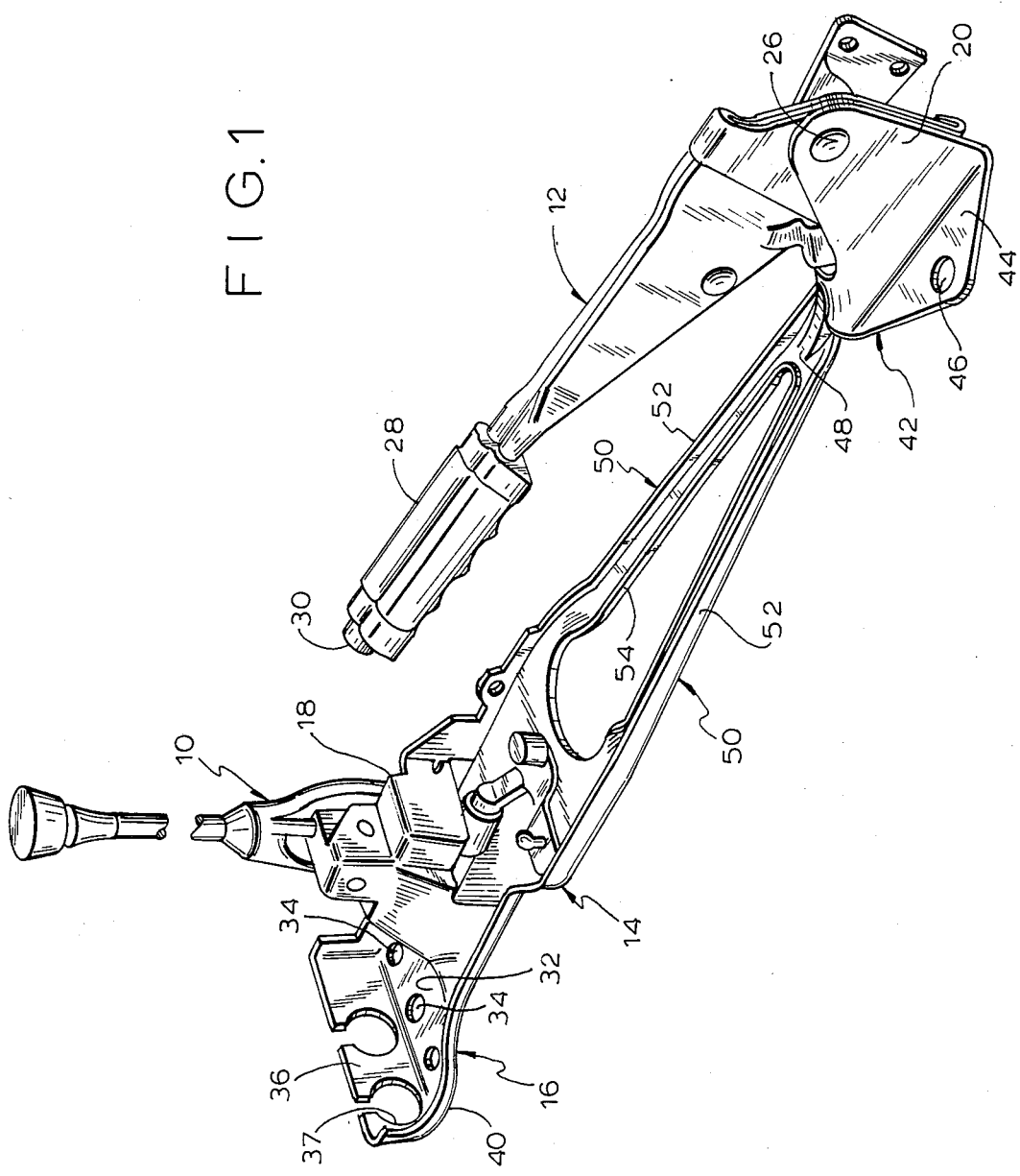
FIG. 1 is a perspective view of an integrated console bracket according to the invention.

An integral assembly is shown in FIG. 1 including a shifter mechanism 10, parking brake mechanism 12, and integrated console bracket 14. The bracket includes a front end 16 including conventional or unconventional linkage attachments 18 mounted thereto. The shifter mechanism 10 is pivotably mounted to the linkage attachments 18 by means of a pivot pin.

An upwardly projecting portion 20 of the bracket 14 includes a hole 24 therethrough. A pivot pin 26 extends through the hole 24 and the lower portion of the parking brake mechanism 12. The parking brake mechanism is conventional in both structure and function and need not be described in great detail. It includes a handle grip 28 and a top brake release button 30 for disengagement purposes.

Figure 2:
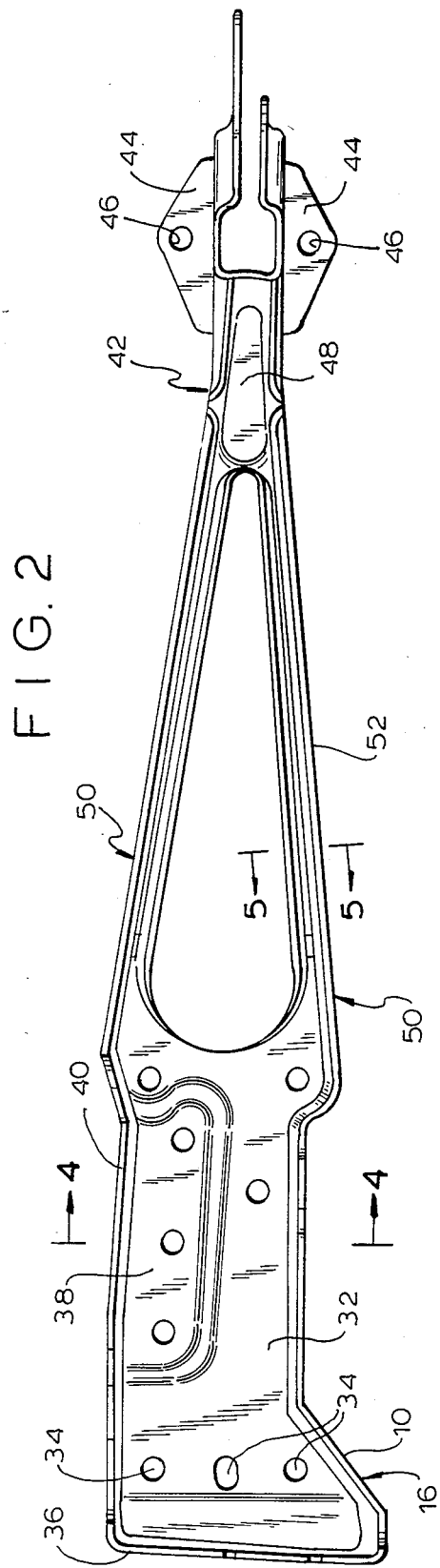
FIG. 2 is a top plan view thereof.
Figure 3:
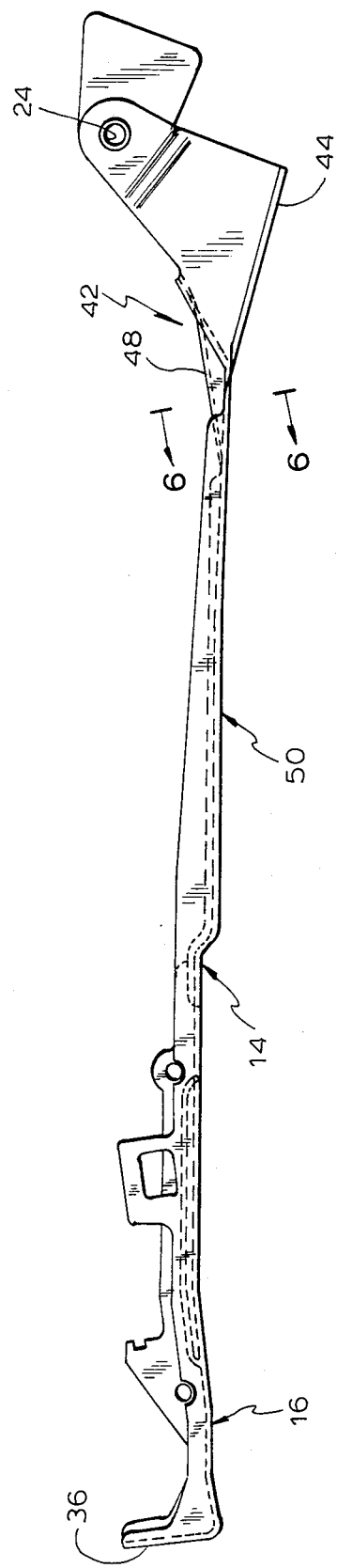
FIG. 3 is a side elevation view thereof.
Figure 6:
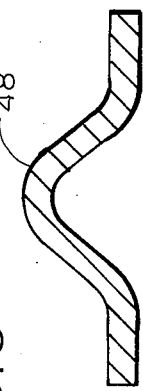
FIG. 6 is a sectional view taken along the plane of line 6—6 in FIG. 3.

The bracket 14 is shown without the shifter and brake mechanisms in FIGS. 2 and 3. The front end includes a substantially flat surface 32 having a plurality of holes 34 therein. A vertically projecting end wall 36 extends from surface 32 and includes two key-hole shaped openings 37 therein. The front end 16 also includes a depressed surface area 38 in which the linkage assembly 18 is mounted. Relatively small first and second side walls 40 define the remainder of the periphery of this end.

The rear end 42 of the bracket includes the upwardly projecting portion 20 and a pair of laterally extending flange members 44. Each of the flange members includes a hole 46 therein for mounting purposes. The front portion of the rear end includes a longitudinally running central ridge 48 which merges with the upwardly projecting portion 20.

The front and rear ends of the bracket are connected by an intermediate portion including a pair of connecting members 50 which converge near the rear end thereof. As shown most clearly in section in FIG. 5, each connecting member 50 is generally J-shaped and includes a relatively high outer wall 52 and a relatively low inner wall 54. Each wall adjoins an arcuate but generally horizontal base portion 56. This configuration provides sufficient strength with a minimum of material and is simple and economical to manufacture.

The bracket 14 is easily mounted to the top of a floor pan tunnel member (not shown) within an automobile or other similar motor vehicle. Alignment problems are eliminated and strong tunnel supports are no longer necessary. The bracket can be easily manufactured by conventional stamping procedures.

What is claimed is:

1. An integrated console bracket assembly comprising:

an integral bracket having a front end, a rear end, and an intermediate portion including a pair of connecting members separated by a space therebetween, said intermediate portion connecting said front end and said rear end;

a shifter mechanism mounted to said front end of said integral bracket, and a parking brake mechanism mounted to said rear end of said bracket.

2. An assembly as defined in claim 1 wherein said connecting members converge in the direction of said rear end.

3. An assembly as defined in claim 1 wherein each connecting member includes a substantially horizontal base portion and a wall extending substantially vertically upwardly therefrom.

4. An assembly as defined in claim 3 wherein each connecting member is generally J-shaped.

5. An assembly as defined in claim 4 wherein each connecting member includes a relatively high outer wall extending substantially vertically from said substantially horizontal base portion and a relatively low inner wall extending substantially vertically therefrom.

6. An assembly as defined in claim 1 wherein said front end includes a substantially flat horizontal surface, an end wall and first and second side walls extending from said surface and defining the periphery thereof.

7. An assembly as defined in claim 1 wherein said rear end includes a front portion adjoining said intermediate porton, said front portion including a longitudinally running central ridge.

8. An assembly as defined in claim 3 wherein said rear end includes a front portion adjoining said intermediate portion, said front portion including a longitudinally running central ridge.

9. An assembly as defined in claim 1 wherein said shifting mechanism includes a pivotably mounted gearshift lever.

10. An assembly as defined in claim 1 wherein said parking brake mechanism includes a pivotably mounted brake lever.

* * * * *